US008179652B2

(12) United States Patent
Depping et al.

(10) Patent No.: US 8,179,652 B2
(45) Date of Patent: May 15, 2012

(54) OVERVOLTAGE PROTECTION ELEMENT

(75) Inventors: Christian Depping, Lemgo (DE); Rainer Durth, Horn-Bad Meinberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 346 days.

(21) Appl. No.: 12/490,488

(22) Filed: Jun. 24, 2009

(65) Prior Publication Data

US 2009/0316319 A1 Dec. 24, 2009

(30) Foreign Application Priority Data

Jun. 24, 2008 (DE) ........................ 10 2008 029 670

(51) Int. Cl.

*H02H 5/04* (2006.01)
*H02H 3/20* (2006.01)
*H02H 9/04* (2006.01)
*H02H 3/22* (2006.01)

(52) U.S. Cl. .................... 361/103; 361/91.18; 361/93.8; 361/111

(58) Field of Classification Search ................... 361/103
See application file for complete search history.

(56) References Cited

U.S. PATENT DOCUMENTS 6,430,019 B1 * 8/2002 Martenson et al. ........... 361/124
7,411,769 B2 8/2008 Schimanski et al.

FOREIGN PATENT DOCUMENTS

DE 42 41 311 C2 6/1995
EP 0 716 493 B1 6/1996
EP 0 987 803 B1 3/2000

* cited by examiner

*Primary Examiner* — Jared Fureman
*Assistant Examiner* — Lucy Thomas
(74) *Attorney, Agent, or Firm* — Roberts Mlotkowski Safran & Cole, P.C.; David S. Safran

(57) ABSTRACT

An overvoltage protection element, with a housing, at least one overvoltage-limiting component in the housing, two connecting elements for electrical connection of the overvoltage protection element to the path to be protected, and an electrically conducting disconnection element in electrically conductive contact with the first connecting element at one end and with a solder connection to the overvoltage-limiting component at another end, the solder connection separating when a temperature threshold of the overvoltage-limiting component is exceeded so that a resulting disconnection point, formed electrically isolates it. Reliable isolation of a defective overvoltage-limiting component and high puncture strength and resistance to creepage are ensured in by a second disconnection point, formed between the first end of the disconnection element and the first connecting element, which interrupts electrically conductive contact between the first end of the disconnection element and the first connecting element when the first disconnection point has opened.

11 Claims, 16 Drawing Sheets

OVERVOLTAGE PROTECTION ELEMENT

BACKGROUND OF THE INVENTION

1. Field of Invention

The invention relates to an overvoltage protection element with a housing, with at least one overvoltage-limiting component which is located in the housing, especially a varistor, with at least two connecting elements for electrical connection of the overvoltage protection element to the current path or signal path to be protected, and with an electrically conducting disconnection element which in the normal state of the overvoltage protection element by its first end is in electrically conductive contact with the first connecting element and by its second end to the overvoltage-limiting component, the second end of the disconnection element being connected via a solder site to the overvoltage-limiting component and the solder connection which is implemented at the solder site between the overvoltage-limiting component and the second end of the disconnection element being separated when the temperature of the overvoltage-limiting component exceeds a given response value so that the disconnection point formed in this way when the overvoltage-limiting element is thermally overloaded electrically isolates it.

2. Description of Related Art

The initially described overvoltage protection element with a thermal disconnector is already known from German Patent DE 42 41 311 C2. In this overvoltage protection element, the first connecting element is connected via a flexible conductor to a rigid disconnection element whose end facing away from the flexible conductor is connected via a solder point to a terminal lug provided on a varistor. The other connecting element is connected directly to the varistor via a flexible conductor. The disconnection element is exposed to a force from a spring system which leads to the disconnection element moving away from the terminal lug when the solder connection is separated so that the varistor is electrically isolated in a thermal overload. By way of the spring system, when the solder connection is separated, a telecommunications contact is activated at the same time so that remote monitoring of the state of the overvoltage protection element is possible.

German Utility Model DE 20 2004 227 U1 and corresponding U.S. Pat. No. 7,411,769 disclose an overvoltage protection element in which the state of a varistor is monitored according to the principle of a temperature switch so that, when the varistor is overheated, a solder connection is separated which is provided between the varistor and a disconnection element; leading to electrical isolation of the varistor. Moreover, when the solder connection is separated, a plastic element is pushed by the reset force of a spring out of a first position into a second position in which the disconnection element, which is made as an elastic metal tongue, is thermally and electrically isolated from the varistor by the plastic element. Since the plastic element has two colored markings located next to one another, it acts additionally also as an optical state display, by which the state of the overvoltage protection element can be easily read off directly on site.

European Patent EP 0 716 493 B1 discloses an overvoltage protection element with two varistors, and two disconnection means which can individually isolate a respective one of the varistors on their live end. The disconnection means each have an elastic disconnection tongue, the first end of the disconnection tongue being permanently connected to the first terminal and the second end of the disconnection tongue, in the normal state of the overvoltage protection element, being attached to a connecting tongue on the varistor by way of a solder site. If impermissible heating of the varistor occurs, this leads to melting of the solder connection. Since the disconnection tongue in the soldered-on state (normal state of the overvoltage protection element) is deflected out of its rest position and is thus pretensioned, the free end of the disconnection tongue moves away from the connecting tongue of the varistor when the solder connection softens, by which the varistor is electrically isolated.

An overvoltage protection element with a thermal isolating mechanism is also known from European Patent EP 0 987 803 B1. In this overvoltage protection element, one end of a rigid, spring-loaded slide, in the normal state of the overvoltage protection element, is soldered both to the first connecting element and also to the terminal lug connected to the varistor. Impermissible heating of the varistor, here, also leads to heating of the solder site so that the is pulled out of the connecting point between the first terminal and the terminal lug slide as a result of the force of a spring acting on it; leading to isolation of the varistor.

The known overvoltage protection elements are generally made as “protective plugs” which, together with the bottom part of the device, form an overvoltage protection device. For installation of such an overvoltage protection device which, for example, is designed to protect the phase-routing conductors L1, L2, L3 and the neutral conductor N, and optionally, also the ground conductor PE, in the known overvoltage protection devices, there are the corresponding terminals for the individual conductors on the bottom part of the device. For simple mechanical and electrical contact-making of the lower part of the device to the respective overvoltage protection element, in the overvoltage protection element, the connecting elements are made as plug pins for which there are corresponding sockets which are connected to the terminals in the lower part of the device so that the overvoltage protection element can be easily plugged onto the bottom part of the device.

In these overvoltage protection devices, installation and mounting can be carried out very easily and in a time-saving manner due to the capacity of the overvoltage protection elements to be plugged in. In addition, these overvoltage protection devices in part still have a changeover contact as the signaller for remote reporting of the state of at least one overvoltage protection element and an optical state display in the individual overvoltage protection elements. It is indicated by way of the state display whether the overvoltage-limiting component, which is located in the overvoltage protection element, is still serviceable or not. The overvoltage-limiting component is especially varistors, here, but depending on the application of the overvoltage protection element, also gas-filled surge arresters, spark gaps or diodes can be used.

The above described thermal isolation device which is used in the known overvoltage protection elements and which is based on melting of a solder connection must perform several functions. In the normal state of the overvoltage protection element, i.e., in the state in which it is not disconnected, a reliable and good electrical connection between the first connecting element and the overvoltage-limiting component must be ensured.

In this case, the disconnection point must satisfy, especially, the requirements of short-circuit strength and pulse current strength. This dictates a solid execution of the current-carrying parts, i.e., especially of the disconnecting element and a low-resistance and mechanically stable connection between the elements of the disconnection point. Moreover, when a certain threshold temperature is exceeded, the disconnection point must ensure reliable isolation of the overvoltage-limiting component and continuous puncture strength and resistance to creepage.

In the known overvoltage protection elements which have a thermally separating disconnection point, the problem exists that, during the thermal separation, a fault current flows by way of the component and leads to heating of the component to be isolated. In this way, when the disconnection point opens, an arc can form by which the vicinity of the disconnection point is thermally loaded. Moreover, in the vicinity of the disconnection point, the metal vapor from the arc precipitates. These loads in the vicinity of the disconnection point lead to a reduction of the dielectric strength in the region of the disconnection point so that the required puncture strength and resistance to creepage cannot always be ensured. This problem is then further exacerbated when the overvoltage protection element is to have dimensions as small as possible so that, after the disconnection point is separated, only a relatively short distance can be achieved between the second end of the disconnection element and the overvoltage-limiting component or the terminal lug.

SUMMARY OF THE INVENTION

A primary object of this invention is, therefore, to provide an overvoltage protection element of the initially described type in which reliable isolation of a defective overvoltage-limiting component together with a puncture strength and resistance to creepage that is as high as possible is ensured.

This object is achieved in an overvoltage protection element of the initially described type in that, between the first end of the disconnection element and the first connecting element, a second disconnection point is formed which interrupts the electrically conductive contact between the first end of the disconnection element and the first connecting element when the first disconnection point has opened. In contrast to the prior art, in the overvoltage protection element in accordance with the invention, thus, not only one, but two disconnection points are provided which are three-dimensionally separated from one another. The first disconnection point first assumes the switching function while the second disconnection point is used primarily to increase the puncture strength and resistance to creepage. Because the two disconnection points are arranged separated three-dimensionally from one another, an arc which forms when the first disconnection point is thermally activated does not have an adverse effect on the puncture strength and resistance to creepage implemented by the second disconnection point; the dielectric strength in the region of the second disconnection point is not reduced by the arc.

According to one preferred configuration of the overvoltage protection element in accordance with the invention, the second disconnection point is a receptacle for the first end of the disconnection element which is electrically conductively connected to the first connecting element. The receptacle is made such that the first end of the disconnection element, in the normal state of the overvoltage protection element, is held in the receptacle, and after opening, the first disconnection point is pulled by a force acting on the disconnection element out of the receptacle. After opening of the two disconnection points, thus, neither is the first end of the disconnection element connected to the first connecting element nor is the second end of the disconnection element connected to the overvoltage-limiting component.

Because electrical contact is interrupted between the first end of the disconnection element and the receptacle which is connected to the first connecting element, an arc is automatically extinguished which may form beforehand between the second end of the disconnection element and the overvoltage-limiting component. Thus, a reduction of the dielectric strength in the region of the thermally active first disconnection point is counteracted.

The force which is acting on the disconnection element and by which the disconnection element is pulled out of the receptacle after opening of the first disconnection point is applied, according to one preferred configuration, by a spring element which is attached to the disconnection element. The spring element is dimensioned such that the first end of the disconnection element is first pulled out of the receptacle by the reset force of the spring element only when the first disconnection point has opened beforehand, i.e., the second end of the disconnection element is no longer connected to the overvoltage-limiting component by way of the solder site.

So that the first end of the disconnection element can be pulled out of the receptacle with as little expenditure of force as possible after opening of the first disconnection point, the first end of the disconnection element, advantageously, has a smaller cross section than the receptacle. In order to ensure electrical contact as good as possible between the first end of the disconnection element and the receptacle, the first end of the disconnection element in the normal state of the overvoltage protection element is arranged inclined in the receptacle so that the disconnection element is held in the receptacle by a clamping force acting between the first end of the disconnection element and the receptacle. The clamping force is chosen such that the contact resistance between the disconnection element and the receptacle is as small as possible.

Further reduction of the force necessary for pulling the first end of the disconnection element out of the receptacle can be advantageously achieved by the force acting on the disconnection element such that its first end is pulled out of the receptacle essentially without tilting after opening of the first disconnection point. Thus, the force is directed essentially parallel to the surface normal of the receptacle.

With respect to the specific structural configuration of the overvoltage protection element in accordance with the invention, especially with respect to the configuration and arrangement of the disconnection element and the receptacle, there are a host of possibilities. According to one version, the disconnection element, in the normal state of the overvoltage protection element, is deflected out of its rest position, the first end of the disconnection element being held clamped in the rigidly made receptacle. When the temperature of the overvoltage limiting component exceeds a given response value so that the solder site softens, the disconnection element springs back into its rest position due to its reset force or as a result of a torque or torsional moment acting on the disconnection element. The force necessary for separating the first disconnection point is stored essentially in the disconnection element in this version.

According to an alternative embodiment, the force necessary for separating the first disconnection point is stored essentially in the receptacle. For this purpose, in the normal state of the overvoltage protection element, in turn, the first end of the disconnection element is held clamped in the receptacle, at this point, however, the receptacle is being deflected out of its rest position so that the receptacle springs back into its rest position when the solder connection is separated. Of course, it is also possible for part of the force necessary for separating the first disconnection point to be stored in the disconnection element and part in the receptacle, when both the disconnection element and also the receptacle are deflected out of their rest position.

The receptacle, according to one version, can be made simply as a slot or depression in the first connecting element into which the first end of the disconnection element is inserted. According to another version, the receptacle is made in the manner of a contact tulip which has at least two opposite legs between which the first end of the disconnection element is inserted. In the normal state of the overvoltage protection element in which the second end of the disconnection element is connected via the solder connection to the overvoltage-limiting component, then, at least one of the two legs is deflected against its spring force so that the second end of the disconnection element, when the first disconnection point is separated, is moved away from the overvoltage-limiting component by the spring force of the receptacle. The receptacle can be made either in one piece with the first connecting element or can be attached to it in an electrically conductive manner, for example, soldered.

In particular, there are now a host of possibilities for embodying and developing the overvoltage protection element in accordance with the invention. Reference is made in this respect both to the following description of preferred embodiments in conjunction with the accompanying drawings.

DETAILED DESCRIPTION OF THE INVENTION

Figure 1:
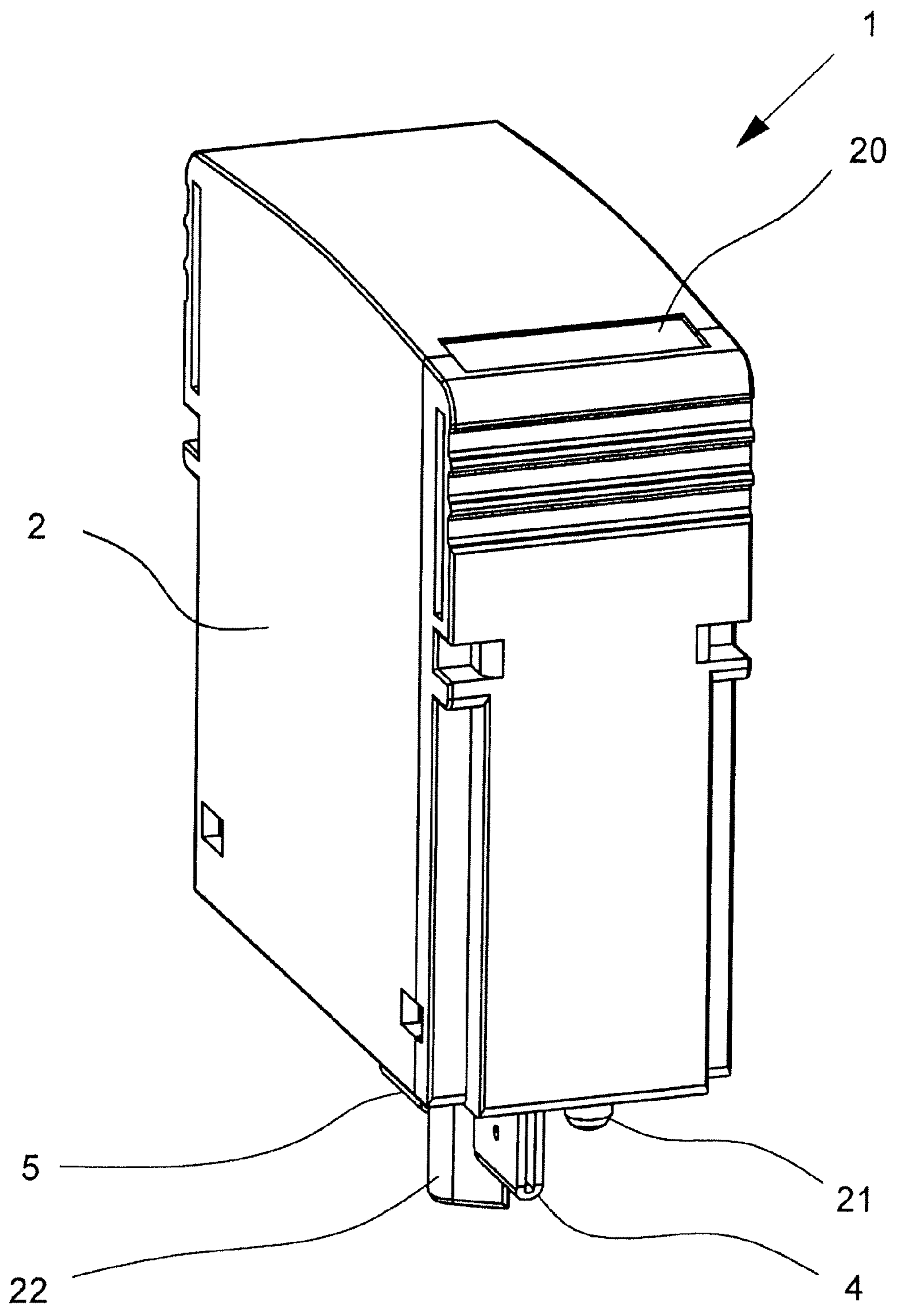
FIG. 1 is a perspective of an overvoltage protection element in accordance with the invention, FIGS. 2*a* & 2*b* schematic depict a first version of the isolation mechanism of the overvoltage protection element in accordance with the invention.

The figures show an overvoltage protection element 1 which is illustrated altogether only in FIG. 1, with a housing 2. In the housing 2, there is an overvoltage-limiting component 3. The overvoltage-limiting component 3, which is shown only schematically in FIG. 2 can be especially a varistor. In FIG. 1, the overvoltage protection element 1 made as a "protective plug" has two connecting elements 4, 5 which are made as plug pins and which can be inserted into the corresponding sockets in the lower part of the device.

The different versions of the isolation mechanism of the overvoltage protection element 1, which are shown only schematically in FIGS. 2*a* to 14 each have an electrically conductive metallic disconnection element 6 which, in the normal state of the overvoltage protection element 1, i.e., in the unisolated state, is connected in an electrically conductive manner with it first end 7 to the first connecting element 4 and with its second end 8 to the varistor 3. The solder connection implemented by the solder site 9 between the overvoltage-limiting component 3 and the second end 8 of the disconnection element 6 is made such that the solder connection separates when the temperature of the overvoltage-limiting component 3 exceeds a given response value.

Heating of the overvoltage-limiting component 3 leads to melting of the solder site 9 so that the disconnection element 6 which, in the soldered-on state is deflected out of its rest position, pivots back into its rest position as a result of the reset force $F_1$ when the solder connection is separated. The disconnection point 10 formed in this way, thus, electrically isolates the overvoltage-limiting component 3 under a thermal overload by the electrically conductive connection between the second end 8 of the disconnection element 6 and the overvoltage-limiting component 3 being separated.

In addition to this first disconnection point 10, the isolating mechanism has a second disconnection point 11 which is formed between the first end 7 of the disconnection element 6 and the first connecting element 4. The second disconnection point 11 is formed by a receptacle 12 which is connected in an electrically conductive manner to the first connecting element 4. As a result of the force $F_2$ of a spring element 13 which acts on the second end 8 of the disconnection element 6, the first end 7 of the disconnection element 6, after opening the first disconnection point 10, is pulled out of the receptacle 12, as is shown in FIGS. 2*b* and 10*b*.

Figure 2A:
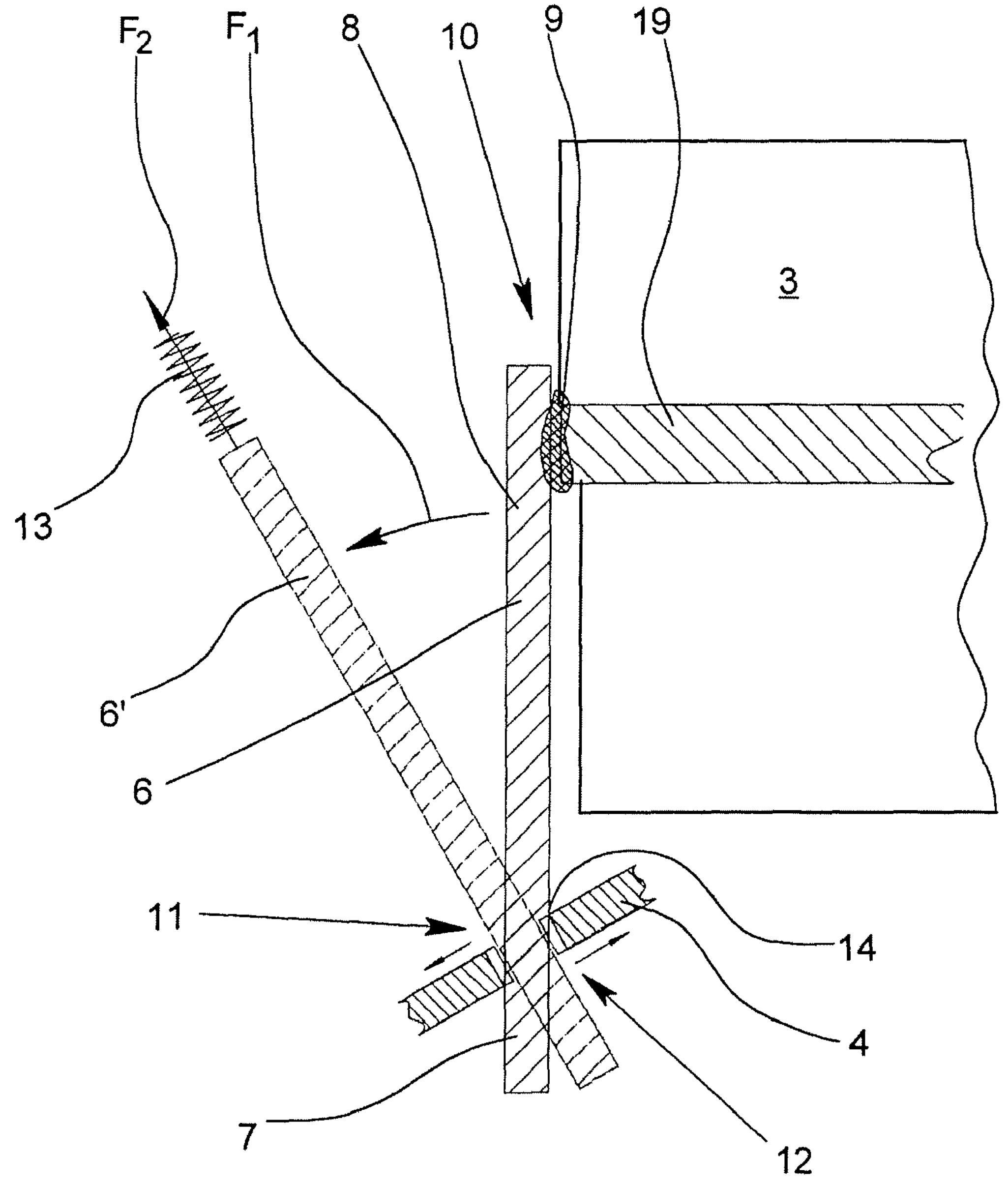
Figure 2B:
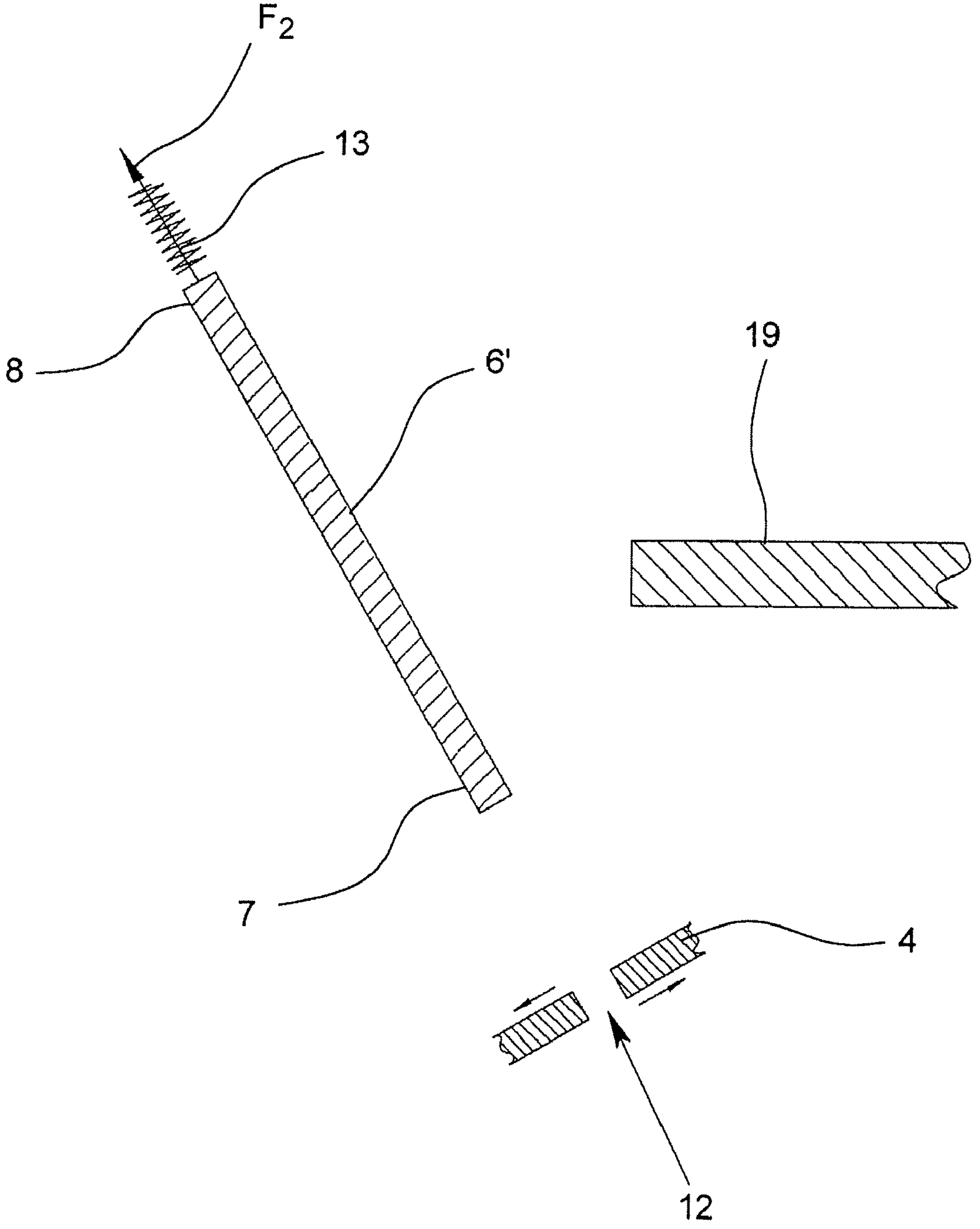

In the embodiment shown in FIGS. 2*a* & 2*b*, the disconnection element 6, in the soldered-on state, is deflected out of its rest position 6' such that the first end 7 of the disconnection element is arranged tilted in the receptacle 12 so that the disconnection element 6 is held in the receptacle 12 by a clamping force acting between the first end 7 of the disconnection element 6 and the receptacle 12. In this regard, in the soldered-on state of the disconnection element 6, a torque acts on the disconnection element 6 around the support point 14 with a lever arm which corresponds to the distance between the resting point 14 and the solder site 9. If the disconnection element 6' is in its rest position after separation of the first disconnection point 10, it can be pulled out of the receptacle 12 by the relatively small reset force $F_2$ of the spring element 13 since the first end 7 of the disconnection element 6 has a smaller cross section than the receptacle 12 and the reset force $F_2$ is directed parallel to the surface normal of the receptacle 12 so that the first end 7 of the disconnection element 6 can be pulled out of the receptacle 12 without tilting.

Figure 3:
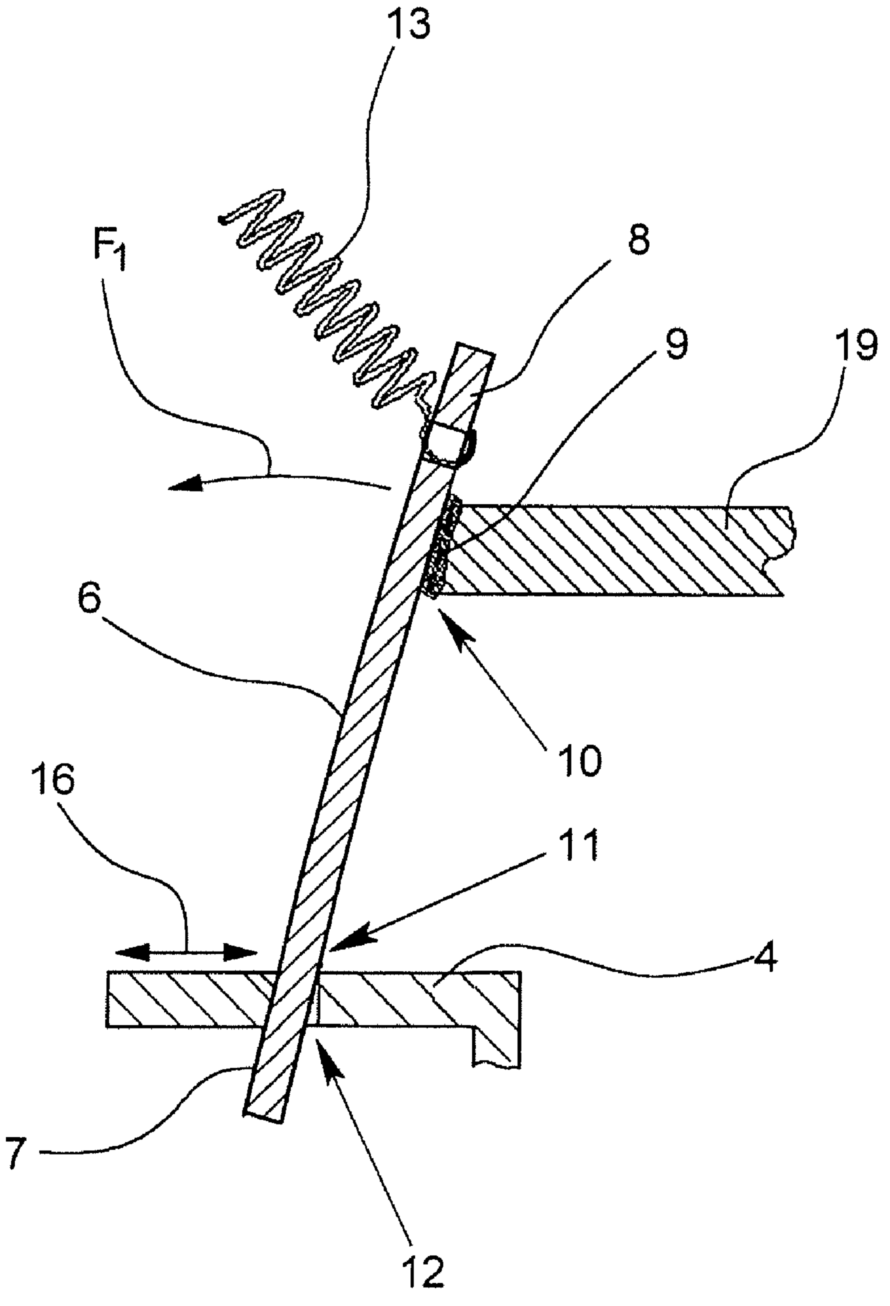
FIG. 3 is a schematic depiction of a second version of the isolation mechanism of the overvoltage protection element.
Figure 4:
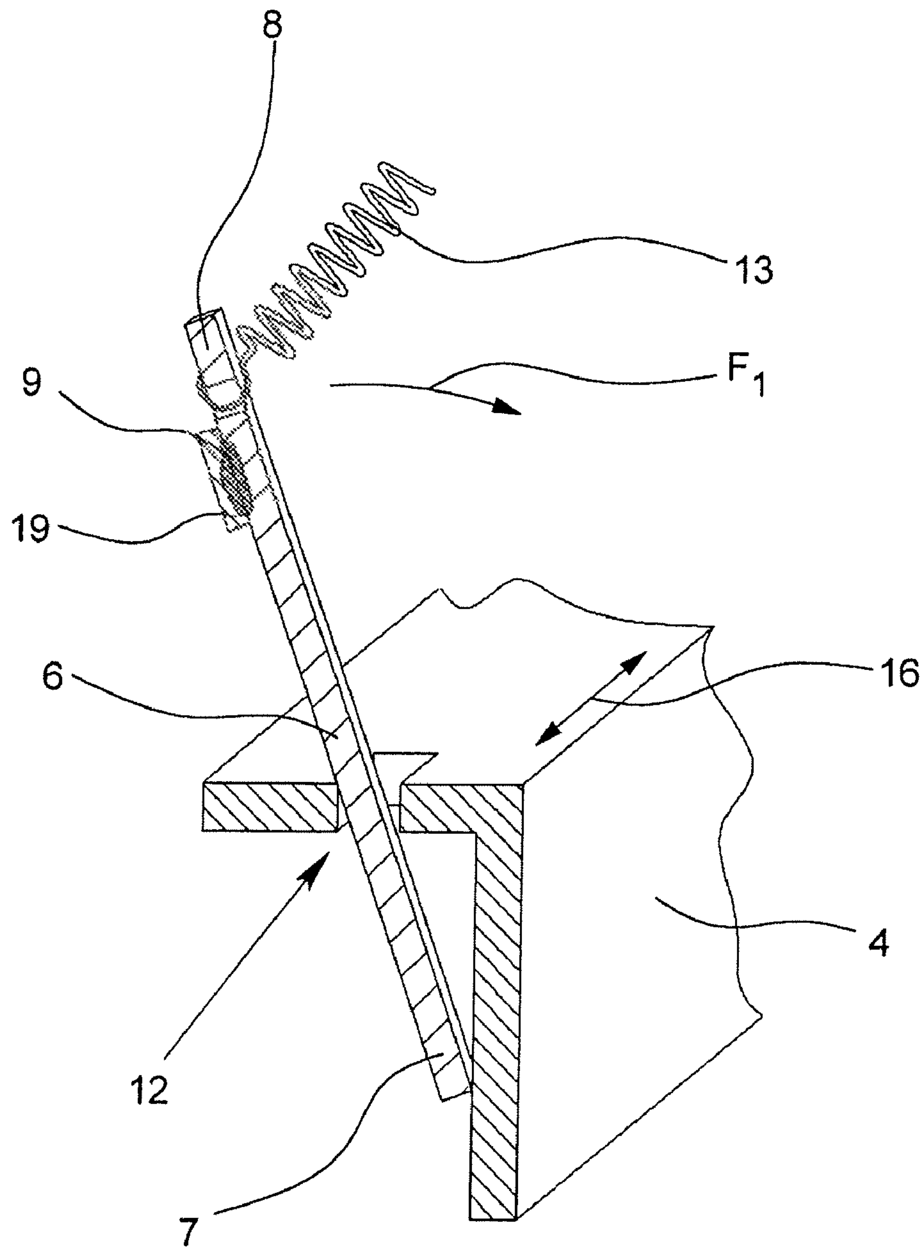
FIG. 4 is a schematic depiction of an version of the isolation mechanism that is similar to the one shown in FIG. 3.
Figure 5:
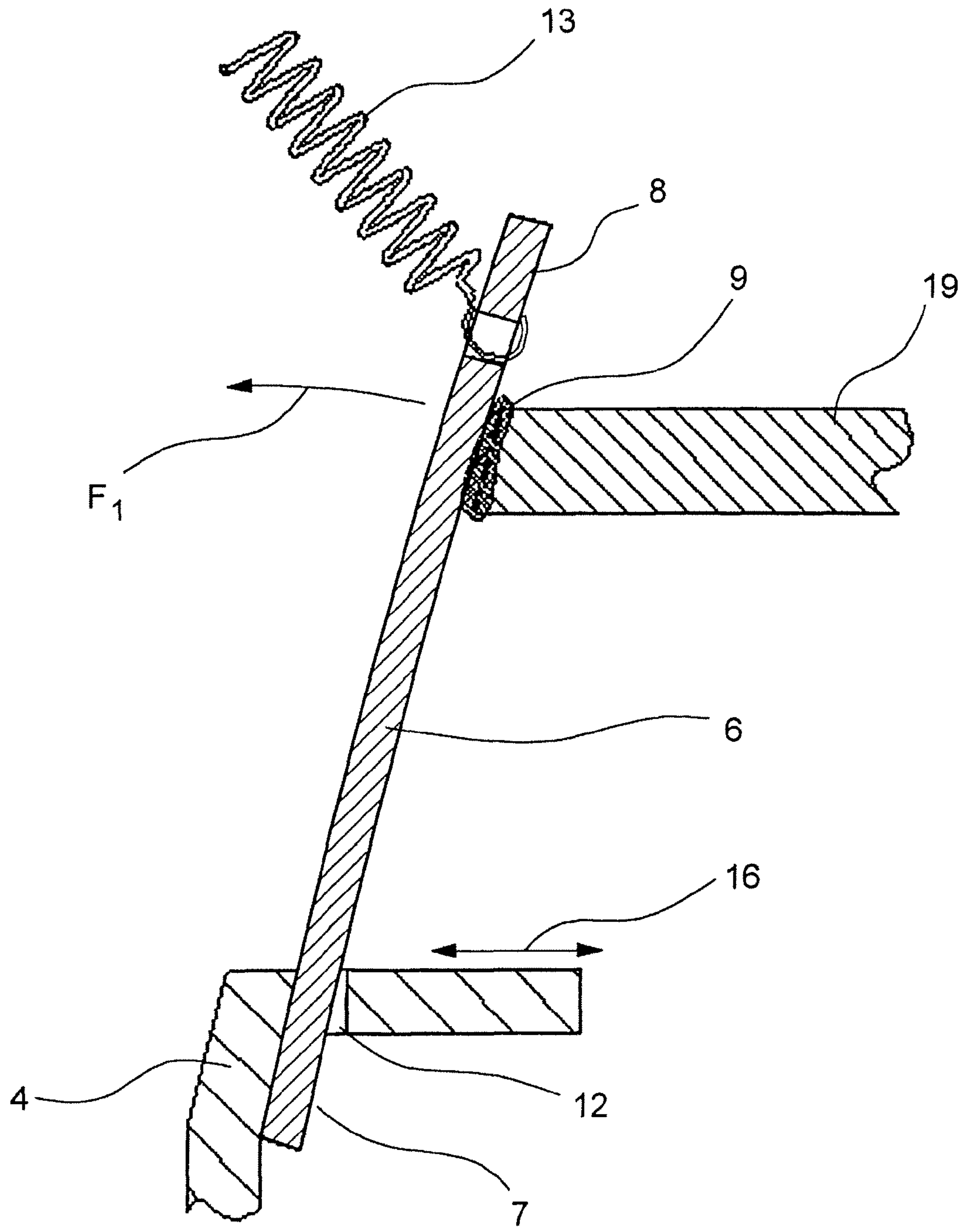
FIG. 5 is a schematic depiction of another version, similar to the one shown in FIG. 3.
Figure 6:
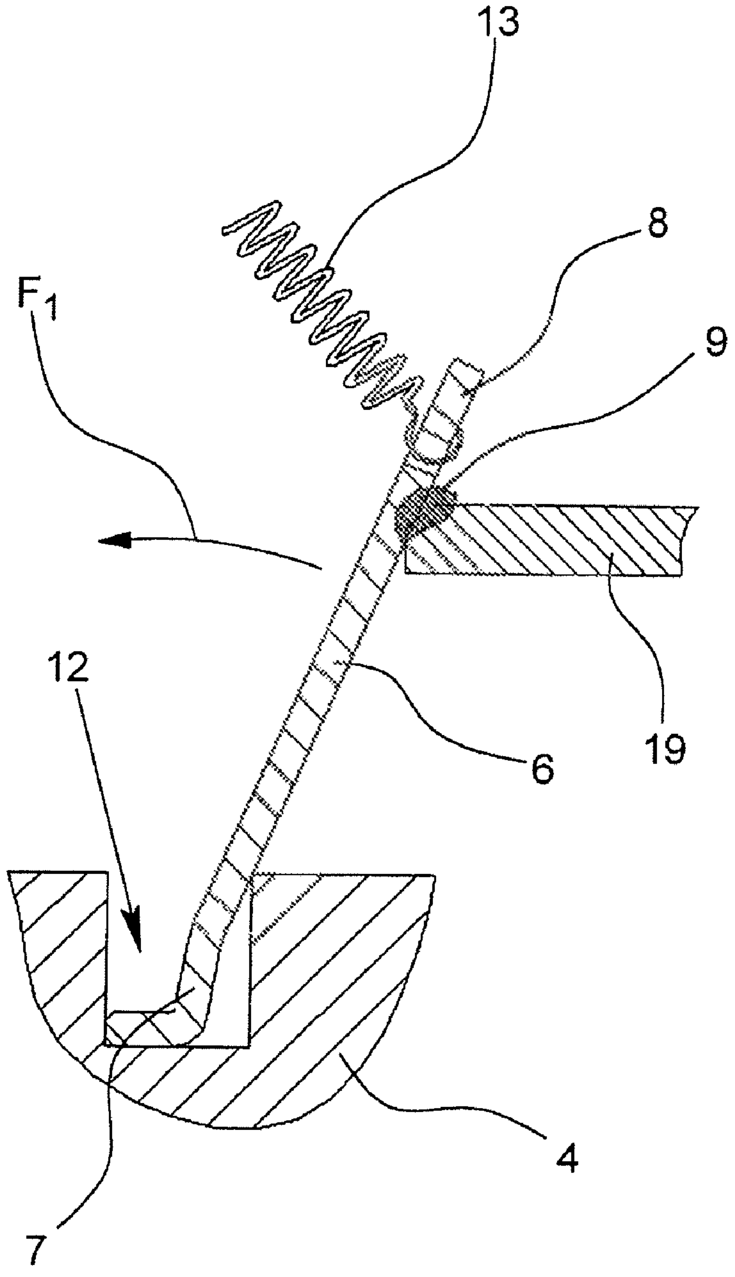
FIG. 6 is a schematic depiction of another version of the isolation mechanism of the overvoltage protection element.
Figure 7:
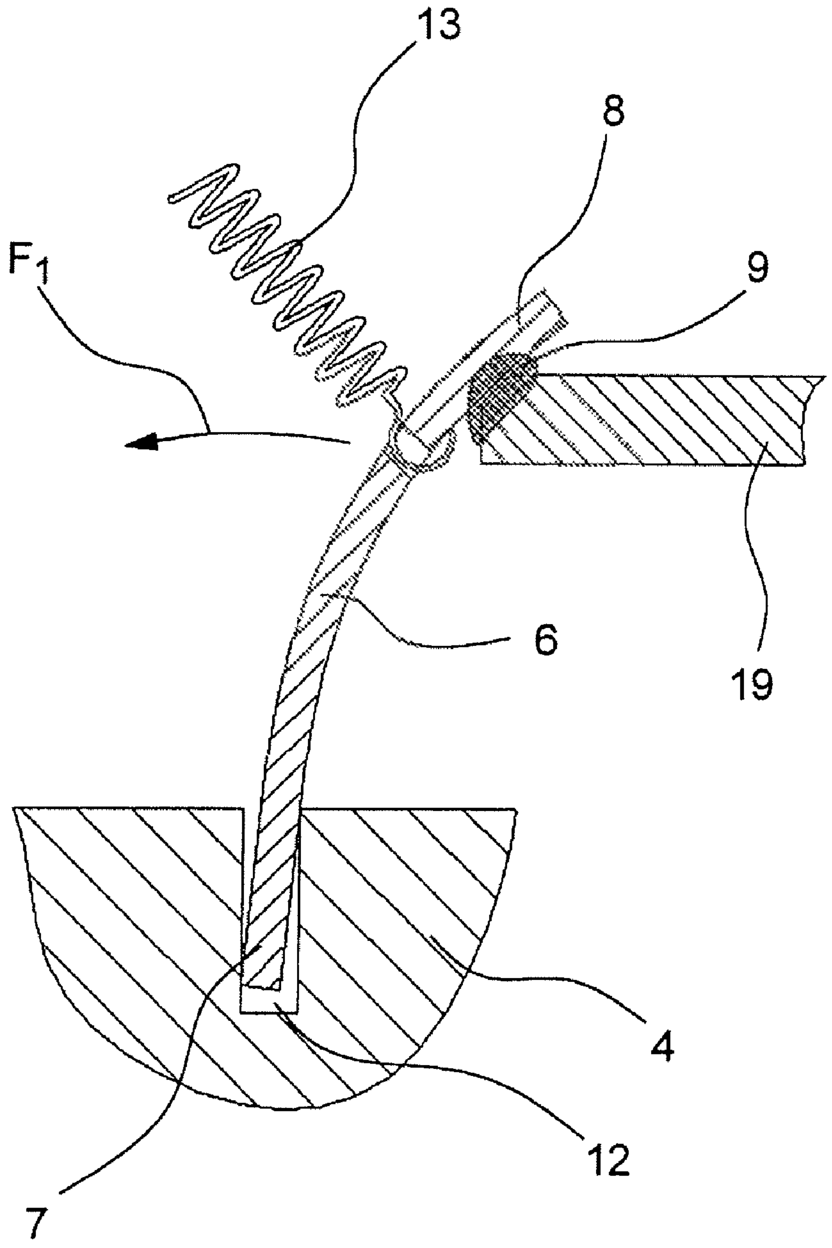
FIG. 7 shows a schematic of one version of the isolation mechanism, similar to the one shown in FIG. 6.
Figure 8:
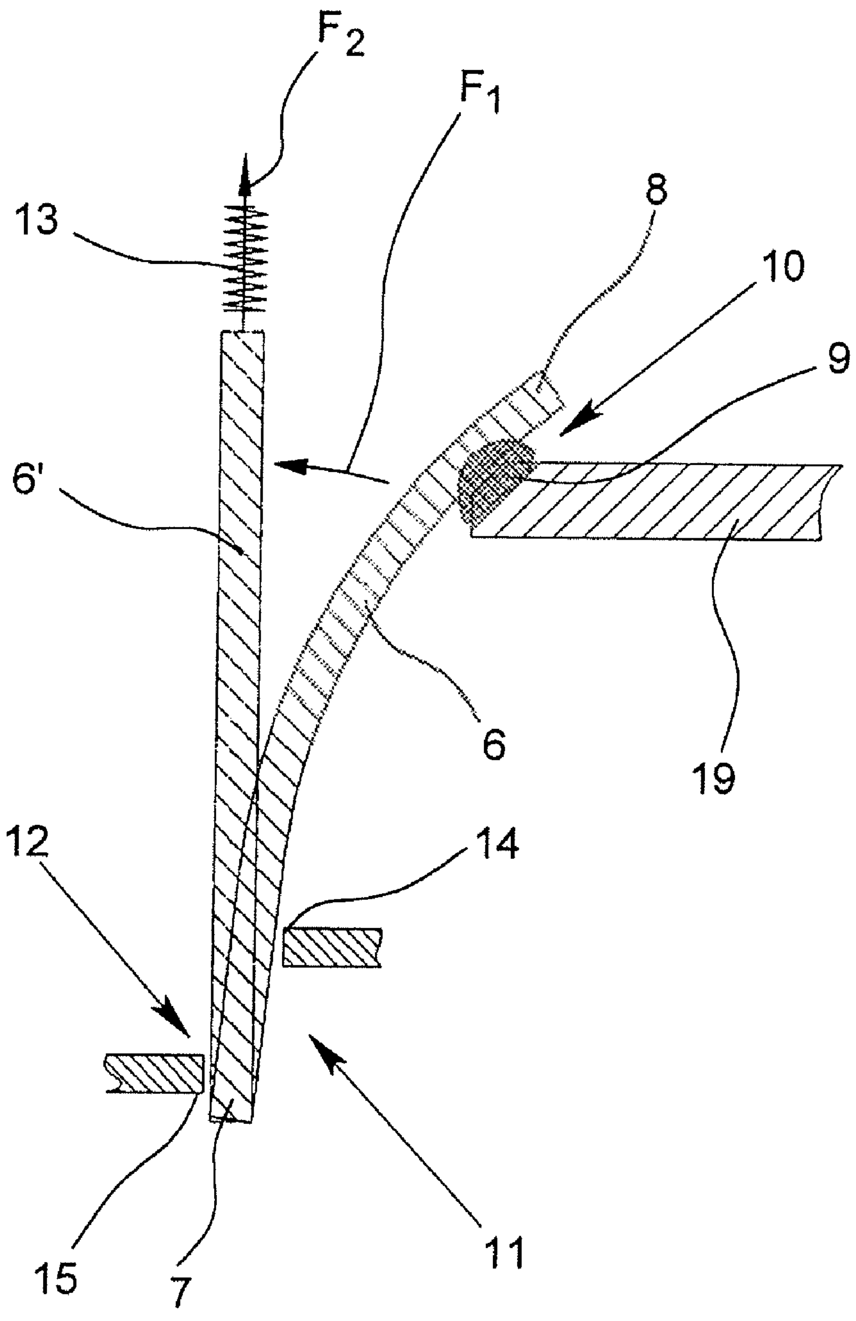
FIG. 8 is a schematic depiction of another version of the isolation mechanism of the overvoltage protection element.
Figure 9:
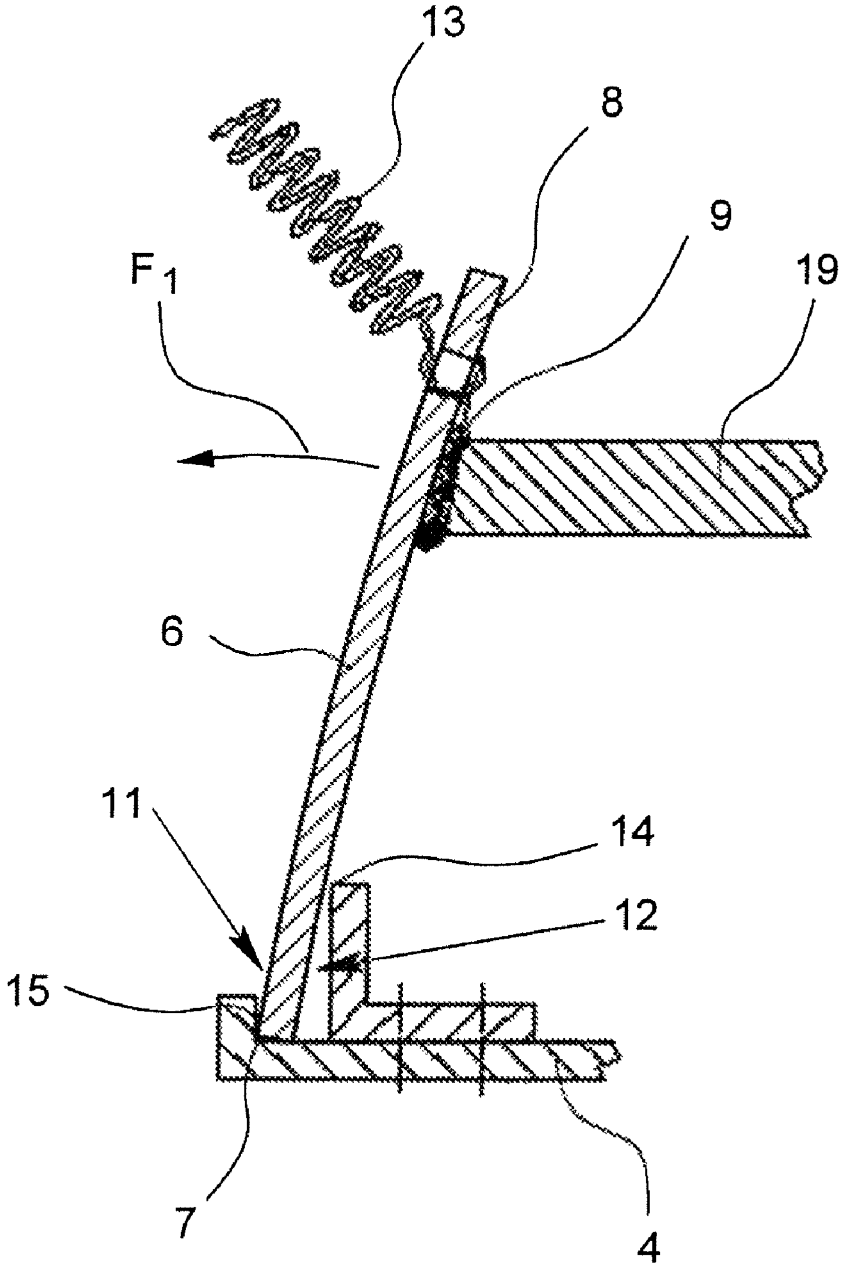
FIG. 9 is a schematic depiction of a version of the isolation mechanism that is similar to the one shown in FIG. 8, FIGS. 10*a* & 10*b* schematic depict another version of the isolation mechanism of the overvoltage protection element.

In the embodiments shown in FIGS. 3 to 5 the receptacle 12—just as in the embodiment as shown in FIGS. 2*a*, 2*b*—is implemented by a slot in the first connecting element 4. In contrast, in the embodiments as shown in FIGS. 6 & 7, a recess in the connecting element 4 is used as a receptacle 12. In the versions as shown in FIGS. 8 & 9, the disconnection element 6, in the soldered-on stat, is resiliently deflected out of its rest configuration so that, when the solder site 9 is heated, the disconnection element 6 springs back into its rest configuration which is identified in FIG. 8 with reference number 6'. The forces which occur due to the deflection of the disconnection element 6 are accommodated by the two support points 14, 15 of the receptacle 12 which are arranged offset relative to one another in the lengthwise direction of the disconnection element 6, i.e., horizontally in FIGS. 8 & 9.

The versions as shown in FIGS. 3 to 5 differ essentially only in that, in the versions as shown in FIGS. 3 & 5, the receptacle 12, which is made as a slot in the connecting element 4, runs transversely to the direction of the current flowing through the connecting element 4, which direction is labelled with reference number 16: In the version as shown in FIG. 4, conversely, the receptacle 12 made as a slot is located parallel to the current direction 16 in the connecting element 4.

Figure 10A:
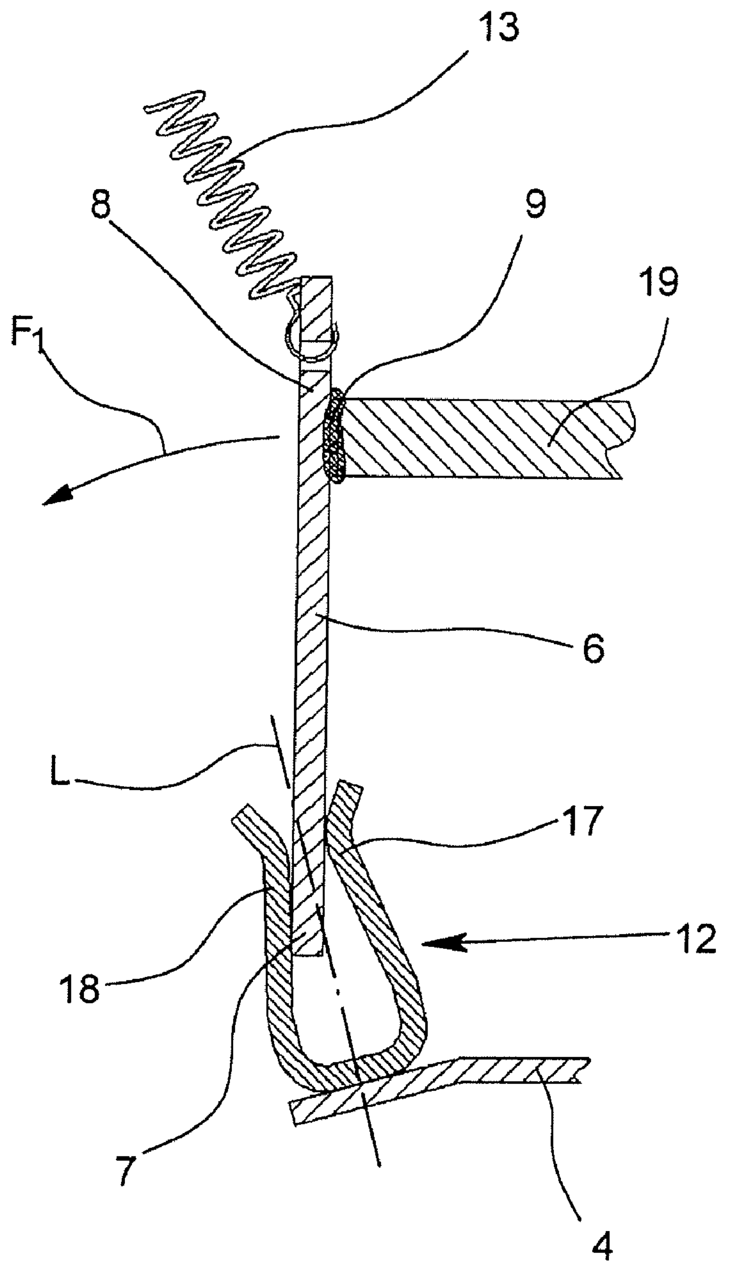
Figure 10B:
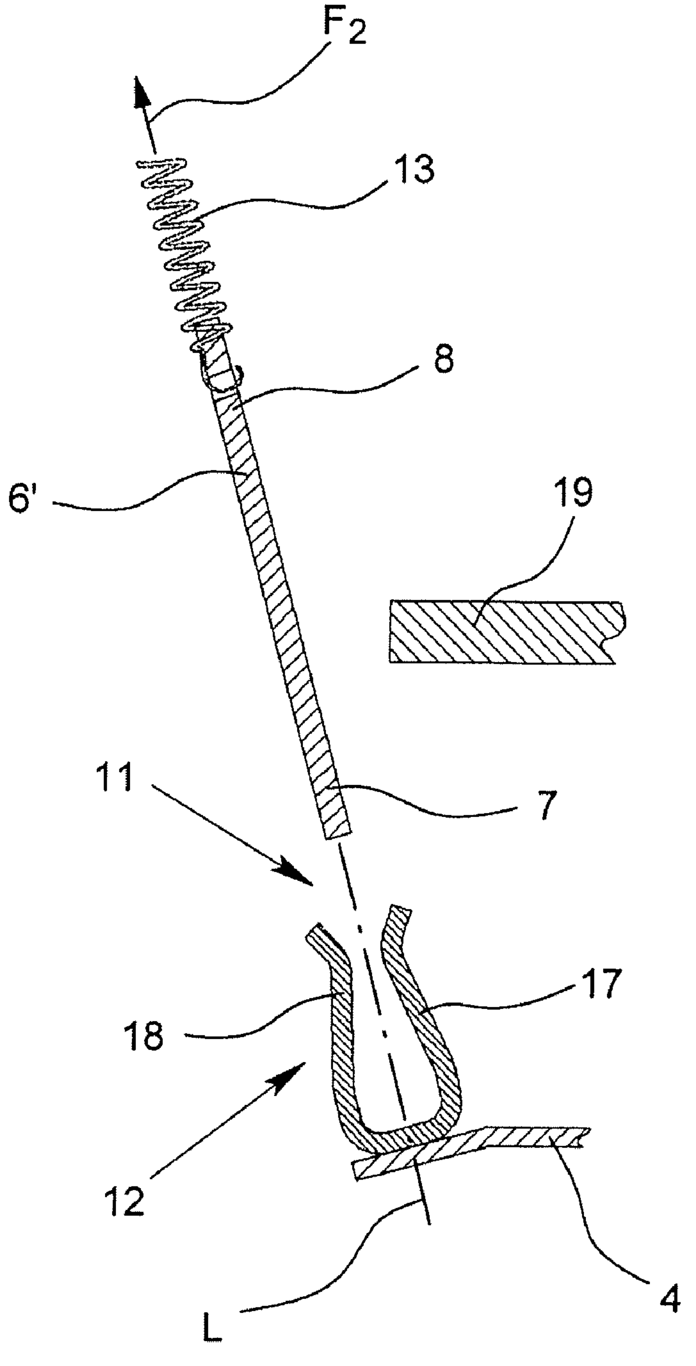
Figure 11:
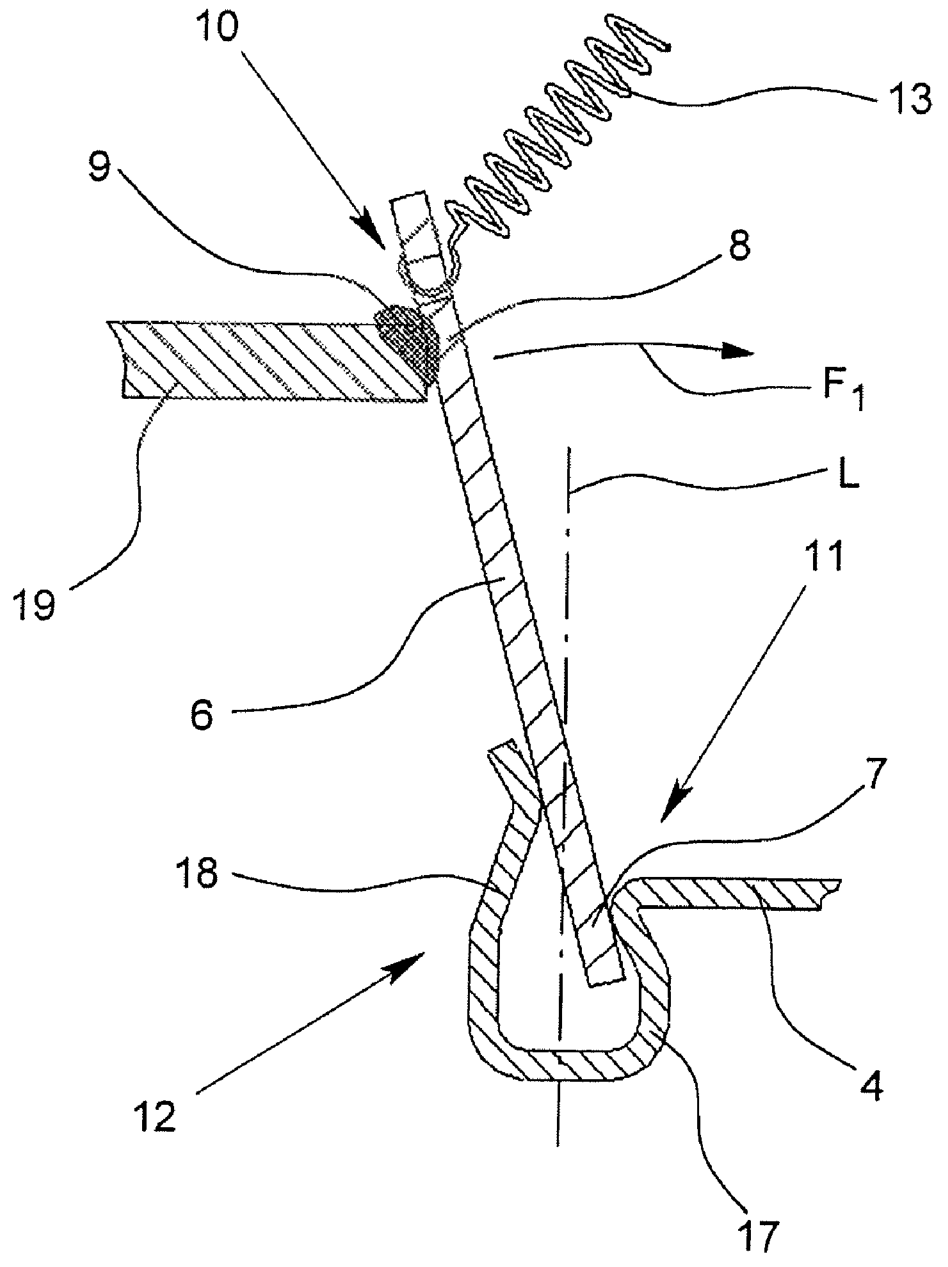
FIG. 11 is a schematic depiction of a version of the isolation mechanism that is similar to that of FIGS. 10*a* & 10*b*.
Figure 12:
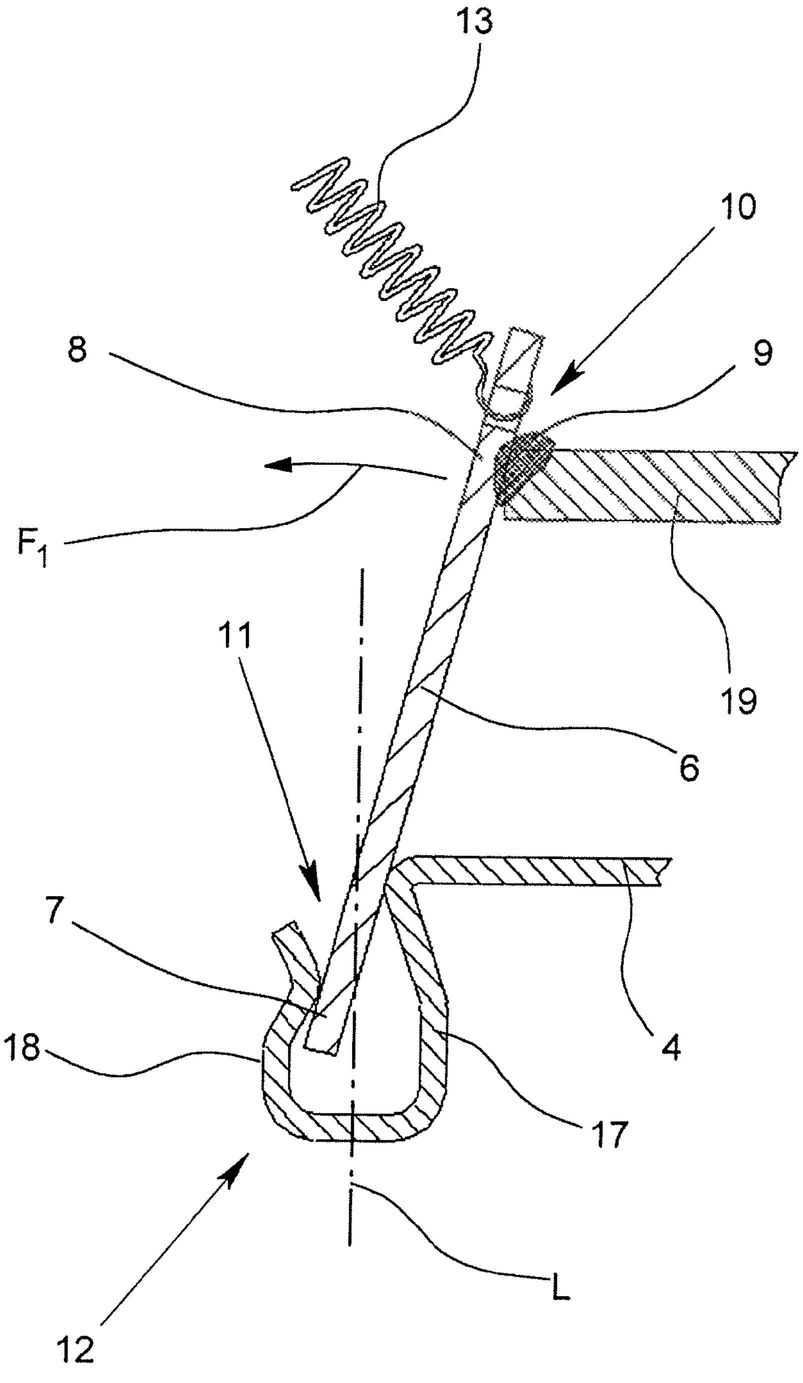
FIG. 12 is a schematic depiction of another version of the isolation mechanism that is similar to the one shown in FIGS. 10*a* & 10*b*.

In the version shown in FIGS. 10*a* to 12, the receptacle 12 is made as a contact tulip with two essentially opposed legs 17, 18, between which the first end 7 of the disconnection element 6 is inserted and is clamped fast by the spring force of the legs 17, 18 of the contact tulip. The reset force $F_1$ acting on the disconnection element 6 is produced by the disconnection element 6 not being held parallel, but tilted, relative to the lengthwise axis L of the contact tulip. As is apparent from FIG. 10*b*, the spring force $F_2$ of the spring element 13 runs parallel to the lengthwise axis L of the receptacle 12 so that the first end 7 of the disconnection element 6 is pulled out of the receptacle 12 after separation of the first disconnection element 10. In this way, for separating the second disconnection element 11, only a relatively small force $F_2$ need be applied by the spring element 13. While in the version as shown in FIGS. 10*a*, 10*b*, the receptacle 12 is a separate component which is attached to the connecting element 4, in the two embodiments as shown in FIGS. 11 & 12, the receptacle 12 is made in one piece with the connecting element 4.

Figure 13:
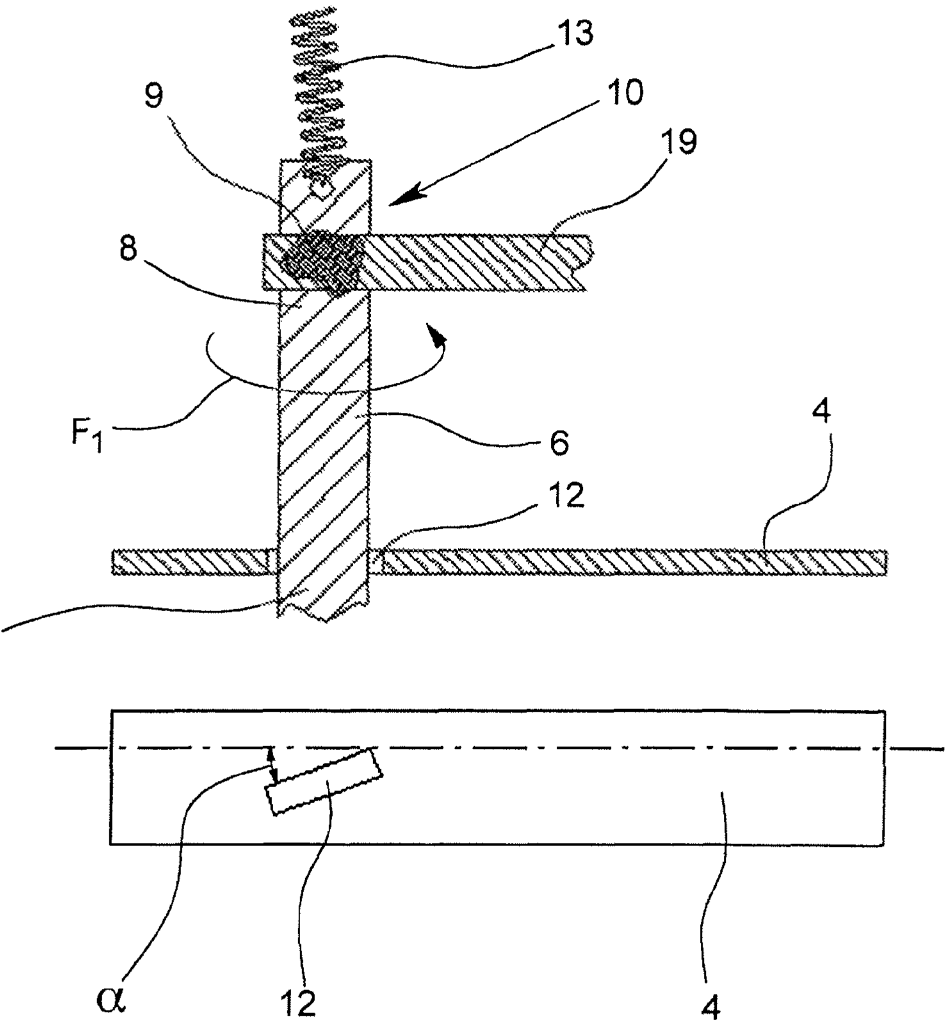
FIG. 13 is a schematic depiction of another version of the isolation mechanism of the overvoltage protection element in accordance with the invention and FIG. 14 is a schematic depiction of yet another version of the isolation mechanism, similar to the one shown in FIG. 13.
Figure 14:
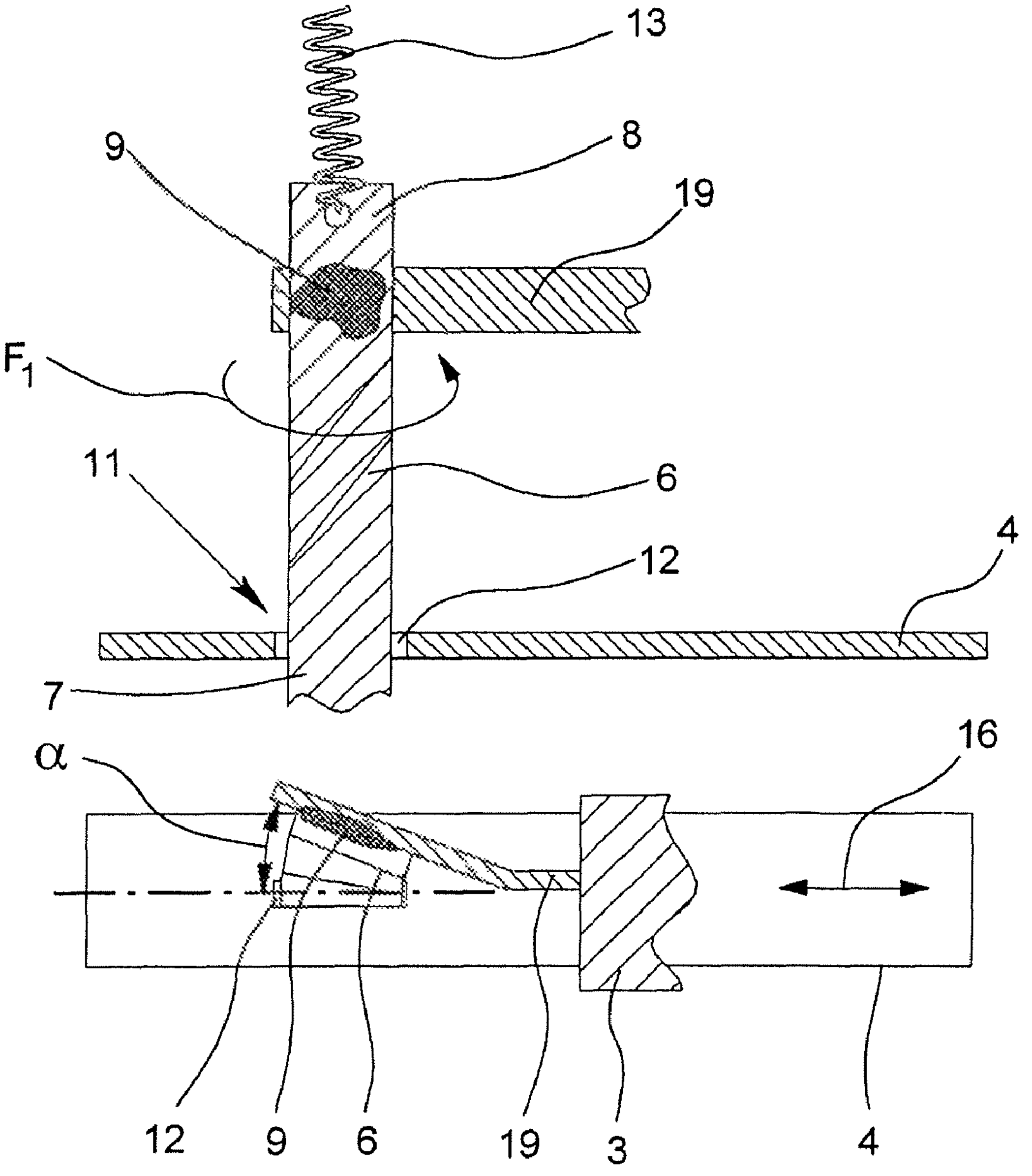

Finally, FIGS. 13 & 14 show two versions of the isolating mechanism of the overvoltage protection element 1 in which the reset force $F_1$ for separating the first disconnection point 10 is stored as a torsional force in the disconnection element 6. As in the other versions, the solder site 9 is not located directly between the overvoltage-limiting component 3 and the second end 8 of the disconnection element 6, but between a connecting tongue 19, which is thermally and electrically connected to the overvoltage-limiting component 3, and the second end 8.

In the embodiment as shown in FIG. 13, the receptacle 12 which is made as a slot is located at an angle α to the lengthwise axis of the connecting tongue 19 in the connecting element 4. In order to solder the disconnection element 6 which has been inserted into the receptacle 12 in the connecting element 4 on the connecting tongue 19, the second end 8 of the disconnection element 6 must be deflected relative to the connecting tongue 19 so that the disconnection element 6, in the soldered-on state, is twisted, by which a torsional force is stored in the disconnection element 6 as a reset force. In the version as shown in FIG. 14, the receptacle 12 made as a slot is likewise located at an angle α to the lengthwise axis of the connecting tongue 19, in this version the receptacle 12 runs parallel to the lengthwise axis of the connecting element 4 and parallel to the current direction 16, while the connecting tongue 19 is located obliquely relative to the lengthwise direction of the connecting element 4. Therefore, here, the second end 8 of the disconnection element 6 must be twisted in a direction relative to the connecting tongue 19 so that, in the soldered-on state, a torsional force $F_1$ is stored in the disconnection element 6 as a reset force.

FIG. 1, also shows that, in the top of the housing 2 of the overvoltage protection element 1, there is a viewing window 20 for an optical state display located underneath. The optical state display is preferably connected by way of a mechanical actuating system to the isolating mechanism so that when the first and/or second disconnection element 10, 11 is separated the optical state display is also automatically actuated.

Moreover, on the bottom of the housing 2, there is a spring-loaded trigger pin 21 whose free end projects through the housing bottom. The trigger pin 21 is used for actuating a telecommunications contact for remote reporting of the state of the overvoltage protection element 1. This telecommunications contact is located in the lower part of the device for an overvoltage protection element 1 made as a "protective plug", the overvoltage protection element 1 together with the bottom part of the device (not shown) forming an overvoltage protection device. Finally, on the bottom of the housing 2 of the overvoltage protection element 1, there is a polarizing element 22 which interacts with a corresponding mating polarizing element in the bottom part of the device.

What is claimed is:

1. Overvoltage protection element, comprising:

a housing, at least one overvoltage-limiting component located in the housing, at least two connecting elements for electrical connection of the overvoltage protection element to a current or signal path to be protected, and an electrically conducting disconnection element which, in a normal state of the overvoltage protection element, has a first end in electrically conductive contact with a first of the connecting elements and a second end in electrically conductive contact with the overvoltage-limiting component, wherein the second end of the disconnection element is connected via a solder connection to the overvoltage-limiting component, wherein the solder connection between the overvoltage-limiting component and the second end of the disconnection element is adapted to separate when the temperature of the overvoltage-limiting component exceeds a given threshold value so that a disconnection point forms when the overvoltage-limiting element is thermally overloaded thereby electrically isolating the overvoltage-limiting element, and wherein a second disconnection point is provided between the first end of the disconnection element and the first connecting element which is adapted to interrupt electrically conductive contact between the first end of the disconnection element and the first connecting element when the first disconnection point is opened.

2. Overvoltage protection element in accordance with claim 1, wherein the second disconnection point is formed by a receptacle which is connected in an electrically conductive manner to the first connecting element, the first end of the disconnection element, in the normal state of the overvoltage protection element, being held in the receptacle and being adapted for being pulled out of the receptacle by a force acting on the disconnection element after opening the first disconnection point.

3. Overvoltage protection element in accordance with claim 2, wherein a spring element is attached to the disconnection element such that the first end of the disconnection element is pulled out of the receptacle by the reset force of the spring element after the first disconnection point has opened.

4. Overvoltage protection element in accordance with claim 2, wherein the first end of the disconnection element has a smaller cross section than the receptacle, and wherein the first end of the disconnection element, in the normal state of the overvoltage protection element, is arranged tilted in the receptacle so that the disconnection element is held in the receptacle by a clamping force acting between the first end of the disconnection element and the receptacle.

5. Overvoltage protection element in accordance with claim 4, wherein said force acting on the disconnection element is directed such that the first end of the disconnection element, after opening of the first disconnection point, is pulled out of the receptacle essentially straight.

6. Overvoltage protection element in accordance with claim 1, wherein, in the normal state of the overvoltage protection element, the first end of the disconnection element is held clamped in the rigid receptacle and the disconnection element is deflected out of its rest position so that the disconnection element moves back into the rest position due to a reset force acting on the disconnection element upon opening of the first disconnection point.

7. Overvoltage protection element in accordance with claim 1, wherein, in the normal state of the overvoltage protection element, the first end of the disconnection element is held clamped in the receptacle and the receptacle is deflected out of its rest position so that the receptacle springs back into the rest position when the solder connection is separated.

8. Overvoltage protection element in accordance with claim 2, wherein the receptacle is in the form of a slot or depression.

9. Overvoltage protection element in accordance with claim 2, wherein the receptacle has at least two opposed legs between which the first end of the disconnection element is received in said normal state.

10. Overvoltage protection element in accordance with claim 1, wherein the solder site is formed between the second end of the disconnection element and a connecting tongue which is connected to the overvoltage-limiting component.

11. Overvoltage protection element in accordance with claim 1, further comprising an optical state display.

* * * * *